US007203826B2

(12) United States Patent
Smith et al.

(10) Patent No.: US 7,203,826 B2
(45) Date of Patent: Apr. 10, 2007

(54) METHOD AND APPARATUS FOR MANAGING A RETURN STACK

(75) Inventors: Rodney Wayne Smith, Raleigh, NC (US); James Norris Dieffenderfer, Apex, NC (US); Jeffrey Todd Bridges, Raleigh, NC (US); Thomas Andrew Sartorius, Raleigh, NC (US)

(73) Assignee: Qualcomm Incorporated, San Diego, CA (US)

( * ) Notice: Subject to any disclaimer, the term of this patent is extended or adjusted under 35 U.S.C. 154(b) by 210 days.

(21) Appl. No.: 11/061,975

(22) Filed: Feb. 18, 2005

(65) Prior Publication Data

US 2006/0190711 A1    Aug. 24, 2006

(51) Int. Cl.
*G06F 9/38* (2006.01)

(52) U.S. Cl. .................. 712/239; 712/242; 712/243
(58) Field of Classification Search ................ 712/202, 712/239, 242, 243
See application file for complete search history.

(56) References Cited

U.S. PATENT DOCUMENTS

| 5,313,634 | A | | 5/1994 | Eickemeyer | |
|---|---|---|---|---|---|
| 5,706,491 | A | * | 1/1998 | McMahan | 712/234 |
| 6,035,118 | A | * | 3/2000 | Lauterbach et al. | 712/233 |
| 6,035,321 | A | | 3/2000 | Mays | |
| 6,151,671 | A | * | 11/2000 | D'Sa et al. | 712/239 |
| 6,289,444 | B1 | * | 9/2001 | Nair | 712/243 |
| 6,530,016 | B1 | * | 3/2003 | Ukai et al. | 712/237 |
| 6,560,696 | B1 | * | 5/2003 | Hummel et al. | 712/237 |
| 2004/0003213 | A1 | | 1/2004 | Bockhaus et al. | |
| 2004/0049666 | A1 | * | 3/2004 | Annavaram et al. | 712/228 |
| 2004/0230779 | A1 | * | 11/2004 | Haghighat et al. | 712/234 |

OTHER PUBLICATIONS

Return Address Stack Cache; IBM Technical Disclosure Bulletin; vol. 34, No. 11, Apr. 1992, pp. 269-271.

* cited by examiner

*Primary Examiner*—William M. Treat
(74) *Attorney, Agent, or Firm*—Nicholas J. Pauley; Thomas Rouse

(57) ABSTRACT

A processor includes a return stack circuit used for predicting procedure return addresses for instruction pre-fetching, wherein a return stack controller determines the number of return levels associated with a given return instruction, and pops that number of return addresses from the return stack. Popping multiple return addresses from the return stack permits the processor to pre-fetch the return address of the original calling procedure in a chain of successive procedure calls. In one embodiment, the return stack controller reads the number of return levels from a value embedded in the return instruction. A complementary compiler calculates the return level values for given return instructions and embeds those values in them at compile-time. In another embodiment, the return stack circuit dynamically tracks the number of return levels by counting the procedure calls (branches) in a chain of successive procedure calls.

25 Claims, 3 Drawing Sheets

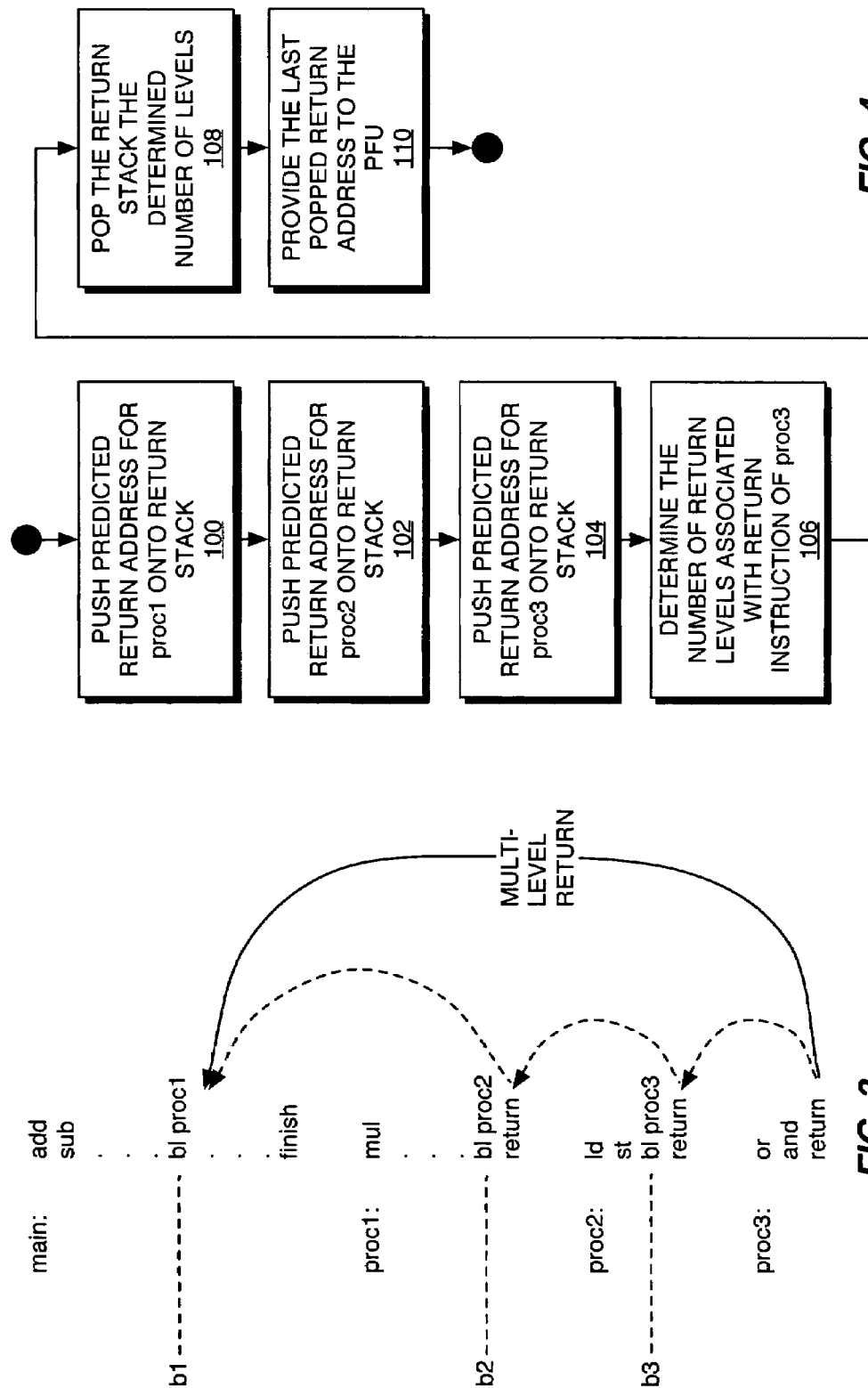

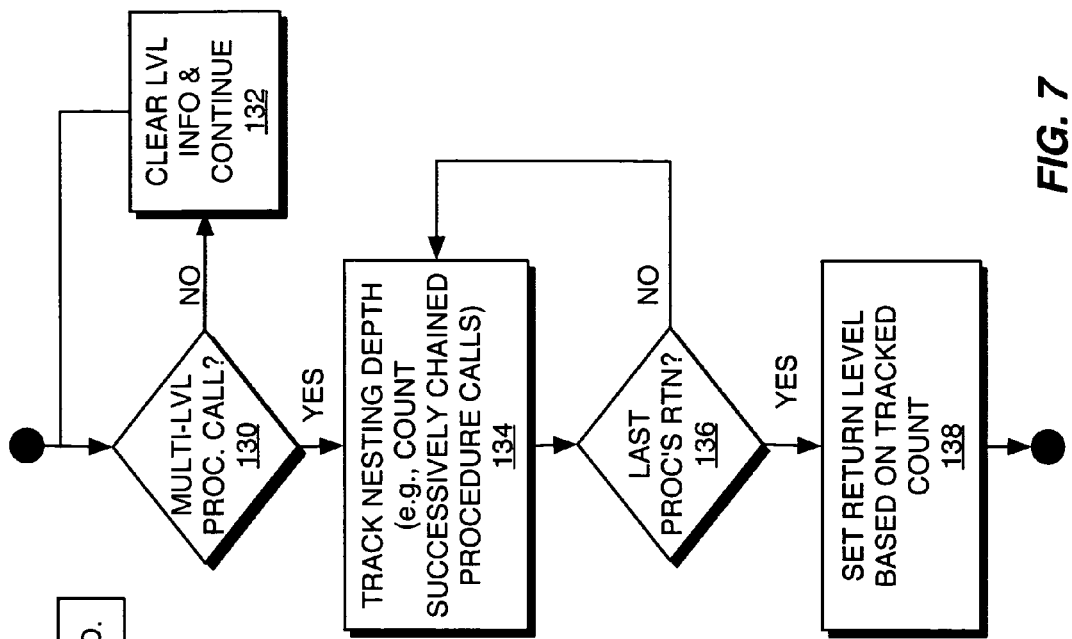
*FIG. 7*
*FIG. 5*
| RETURN INSTRUCTION OPCODE | RETURN LEVEL IND. |
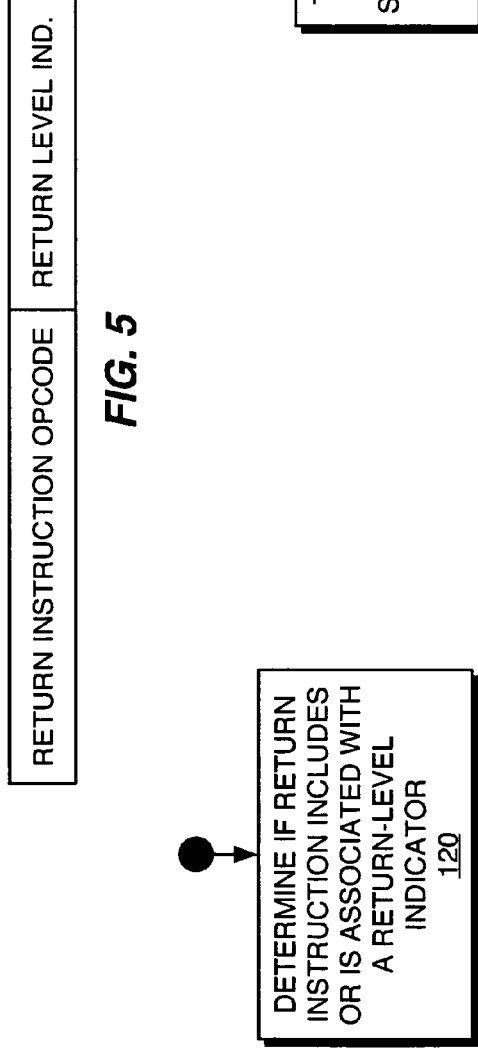
*FIG. 6*

METHOD AND APPARATUS FOR MANAGING A RETURN STACK

BACKGROUND

1. Field of the Invention

The present invention generally relates to microprocessors, and particularly relates to managing hardware return stacks used by some types of microprocessors for accelerating returns from procedure calls.

2. Relevant Background

As microprocessors are deployed in an ever-increasing array of applications that require sophisticated functionality, increasing the microprocessor's execution speed is desirable. Additionally, in embedded applications such as portable electronic devices with limited battery power, decreasing the microprocessor's power consumption is desirable. Simply increasing a microprocessor's clock speed, however, may not yield the desired increase in system performance because various input/output bottlenecks impose constraints on the microprocessor's real-world performance. For example, off-chip memory accesses generally run slower than on-chip memory accesses, leading to the use of instruction and data caching techniques. Reduced Instruction Set Computers (RISC) generally issue one or more instructions per clock cycle, and often use instruction caching to enhance performance. Pipelined RISC processors can issue multiple instructions per clock cycle and typically make heavy use of data and instruction caching.

Instruction caching ("pre-fetching") predicts future instructions and brings them into an on-chip instruction cache in advance of the microprocessor executing them. Pre-fetching can eliminate much of the delay associated with slower off-chip instruction memory, when the correct instructions are pre-fetched. Most instructions execute sequentially, and can be pre-fetched with confidence. Conditional branch instructions may "take" a branch or not, depending on a branch condition that is typically only evaluated deep in the pipeline. To avoid the delay in waiting for this evaluation, the behavior of branch instructions is often predicted early in the pipeline, and instructions are pre-fetched from the predicted branch target address. Instruction pre-fetching methods include both static and dynamic instruction pre-fetching.

Dynamic instruction pre-fetching relies on instruction execution history, and may involve tracking the accuracy of previous taken or not-taken predictions for a given number of the most recent conditional branch instructions, for example. Static pre-fetching generally does not rely on execution history, and may be used, for example, when encountering conditional branches for the first time. One type of branch instruction for which static pre-fetching offers performance advantages is the return instruction from a called procedure, wherein the procedure's return address is predicted to support pre-fetching of instructions beginning at that predicted return address.

A "return stack" can be used to support static prediction of return addresses for procedure call return instructions. A typical return stack comprises a multi-level buffer. When a procedure call instruction is predicted or recognized, a corresponding return address can be taken from the execution stage of the microprocessor's instruction pipeline and pushed onto the return stack. Conversely, when a procedure return instruction is predicted or recognized, the return address currently at the top of the return stack is popped from the stack and used as the predicted return address for instruction pre-fetching.

Thus, in a conventional approach to managing a return stack, corresponding predicted return addresses are sequentially pushed onto the return stack as procedure calls are encountered. Conversely, return addresses are sequentially popped from the stack as procedure return instructions are encountered. This conventional approach incorrectly predicts procedure return addresses in multi-level procedure calls, wherein successive procedure calls are "chained" together in that the return instruction of each succeeding procedure call in the chain points back to the return instruction of the preceding procedure call.

Optimally, the return address that should be predicted for the return instruction of the last procedure in the chain is the return address corresponding to the first procedure call in the chain. However, since the successive procedure calls result in sequentially pushing the return address of each nested procedure call onto the return stack, the return address popped for the return instruction of the last procedure call is that of the immediately prior calling procedure in the chain. If pre-fetching continues from that address, the next instruction fetched will be another return, which will again pop the return stack. Successively popping the return stack in this manner needlessly decreases processor performance and wastes power.

SUMMARY OF THE DISCLOSURE

The present invention comprises a method and apparatus enabling a microprocessor to correctly predict the return address of the original, top-level calling procedure in a multi-level procedure call. Such multi-level procedure calls comprise a chain of two or more successive procedure calls, with the return address of each succeeding procedure pointing back to the return instruction of the immediately preceding procedure. Instead of providing the last-pushed return address as the target of the return instruction in the last procedure called in the chain, a return stack circuit according to one or more embodiments of the present invention sequentially pops the number of return addresses from the stack equal to the number of return levels in the chain of successively called procedures. In so doing, the return stack circuit retrieves the return address of the original calling procedure, which can be provided to an instruction pre-fetch unit as the target for instruction pre-fetching.

Thus, in one embodiment, the present invention comprises a method of managing a return stack based on determining the number of return levels associated with a return instruction, and popping that number of return addresses from the return stack. The last popped address may be provided to an instruction pre-fetch unit as the target address for instruction pre-fetching. The number of return addresses to be popped from the stack to obtain the predicted return address for a given return instruction can be read from a static level-indicator value associated with the return instruction, or can be determined on the fly during program execution.

In one embodiment, the level-indicator may comprise a field or tag embedded in the return instruction, its value having been determined at compile-time. Thus, the present invention includes a method of program compilation, wherein compiler logic determines the number of return levels associated with a return instruction, and sets a return-level indicator associated with the return instruction to a value corresponding to that number. To determine the number of return levels, the compiler may count the number of procedure calls in a chained sequence of procedure calls. In general, the compiler determines the number of return levels associated with a return instruction by detecting chained procedure calls, tracking a nesting depth of a given chain of procedure calls, and setting the number of return levels for a last return instruction in the given chain of procedure calls according to the nesting depth.

In another embodiment, the return stack circuit or other supporting logic in the microprocessor dynamically determines the number of return levels associated with a given return instruction at run-time. With this configuration, it is not necessary to store return level indicators at compile-time. Run-time determination of return levels can be based on methods similar to those used for the compile-time embodiments. For example, the supporting logic can count the number of procedure calls in a chained sequence of procedure calls and set the return level value for the return instruction of the last called procedure based on the count. More generally, dynamic run-time tracking comprises detecting chained procedure calls, tracking a nesting depth of a given chain of procedure calls, and setting the number of return levels for a last return instruction in the given chain of procedure calls according to the nesting depth.

BRIEF DESCRIPTION OF THE DRAWINGS

FIG. 3 is a program instruction flow diagram illustrating a multi-level procedure call comprising successively chained procedure calls.

FIG. 4 is a logic flow diagram illustrating a process whereby a return stack is popped according to the number of return levels in a given multi-level procedure call.

FIG. 5 is a block diagram of a compiler-generated return instruction, including an embedded return-level indicator.

FIG. 6 is a logic flow diagram illustrating a process whereby a return stack is popped the number of times indicated by the level indicator embedded in or associated with a given return instruction.

FIG. 7 is a logic flow diagram illustrating a process for detecting multi-level procedure calls, tracking the call nesting depth within such multi-level procedure calls, and setting return levels based on the tracked depth.

DESCRIPTION OF EMBODIMENTS OF THE INVENTION

Figures 1, 2:
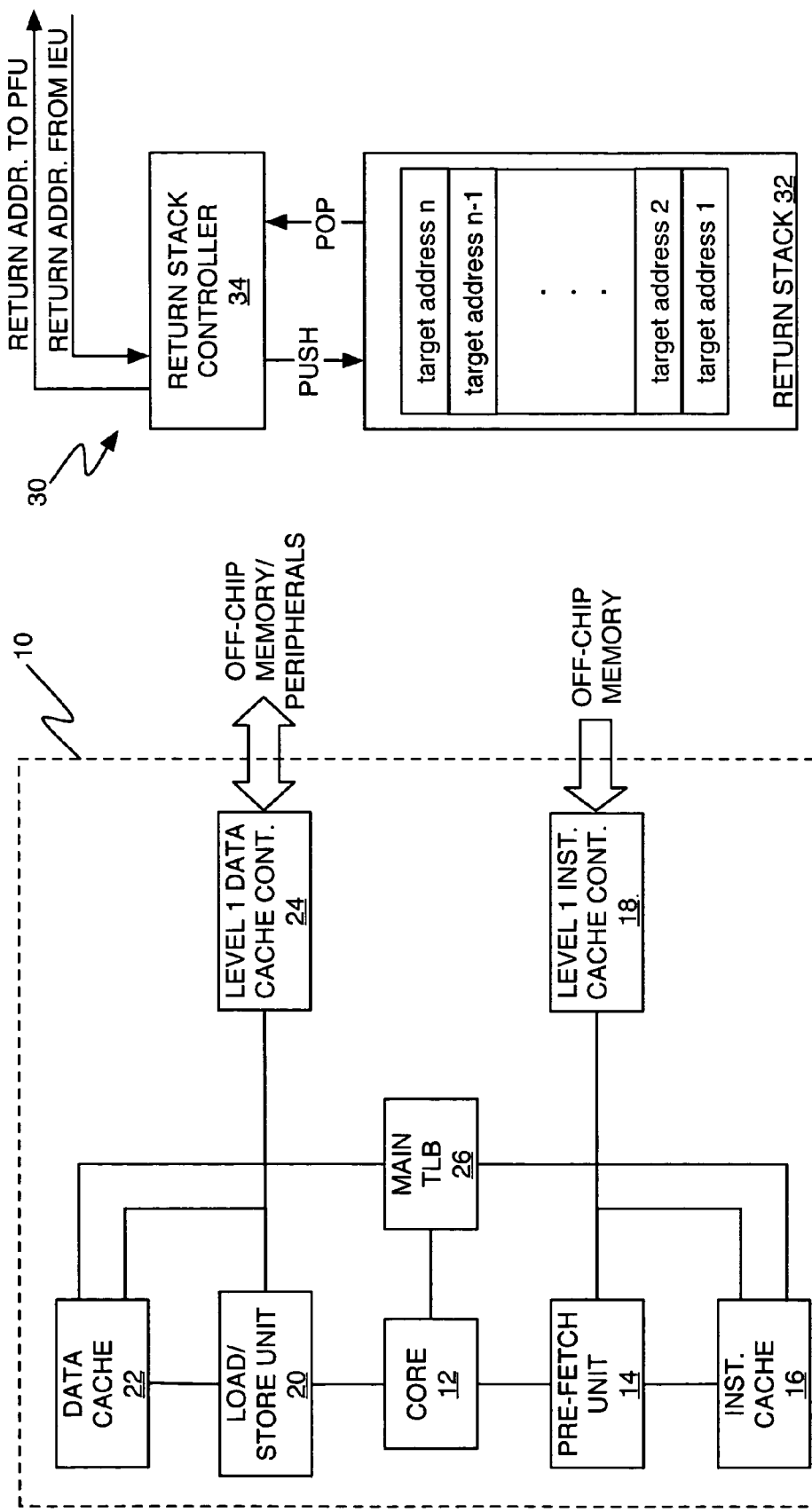
FIG. 1 is a block diagram illustrating a microprocessor.
FIG. 2 is a block diagram illustrating a return stack used in the microprocessor of FIG. 1.

FIG. 1 at least partially illustrates a microprocessor 10 comprising a processor core 12, an instruction pre-fetch unit 14, an instruction cache 16, an instruction cache controller 18, a load/store unit 20, a data cache 22, a data cache controller 24, and a main translation lookaside buffer 26. By way of non-limiting example, the microprocessor 10 may be a pipelined processor based on a Reduced Instruction Set Computer (RISC) architecture.

In one or more embodiments, the core 12 includes an instruction execution unit (not shown) comprising one or more multi-stage instruction pipelines. In operation, the core 12 executes program instructions and carries out corresponding load/store data operations. The translation lookaside buffer 26 accepts inputs from the core 12 and provides outputs to the core 12. More particularly, the translation lookaside buffer 26 interfaces the core 12 to the instruction and data caches 16 and 22, respectively. The instruction and data caches 16 and 22 comprise fast, on-board memory, and the microprocessor 10 uses instruction and data pre-fetching via the instruction and data cache controllers 18 and 24 to keep the caches filled with the next-needed instructions and data.

In particular, instruction pre-fetching operations of the microprocessor 10 include predictions of the instruction stream on returns from called procedures. Predicting the addresses of procedure returns improves performance by enabling the microprocessor 10 to begin pre-fetching the instructions most likely needed after the procedure is completed.

FIG. 2 illustrates one embodiment of a return stack circuit 30 used by the core 12 to predict the target address of a procedure return instruction. The illustrated return stack circuit 30 comprises a return stack 32 and an associated return stack controller 34. Temporary storage registers can be logically linked together under control of the return stack controller 34 to form the return stack 32. Various buffer arrangements can be implemented, but in one embodiment the return stack 32 is configured as last-in-first-out memory stack.

When an instruction execution unit in the core's instruction pipeline (not shown) predicts or otherwise recognizes a procedure call, the return stack controller 34 receives the corresponding return address and pushes it onto the return stack 32. The return stack controller 34 thus sequentially pushes procedure return addresses one at a time onto the return stack 32 as procedure calls are predicted. As procedure return instructions are encountered or predicted, the return stack controller 34 normally pops the procedure return addresses, providing them to the instruction pre-fetch unit 14.

However, contrary to conventional return stack management methods, the return stack controller 34 does not always obtain the return address for instruction pre-fetching by popping just one return address at a time from the return stack 32. Indeed, the return stack controller 34 is generally configured to push return addresses sequentially onto the return stack 32 and to pop return addresses sequentially from the return stack 32, but it is particularly configured to determine the number of return levels associated with a given return instruction, and pop that number of return addresses from the return stack 32. The last popped return address is then provided to the pre-fetch unit 14 as the predicted procedure return address.

The ability to pop more than one return address at a time from the return stack 32 allows the return stack controller 34 to correctly predict the return address of the original, top-level calling procedure in a multi-level procedure call. Such multi-level procedure calls comprise a chain of two or more successive procedure calls, with the return address of each succeeding procedure pointing back to the return instruction of the immediately preceding procedure.

FIG. 3 illustrates a series of program instructions, including a number of procedure calls comprising a multi-level procedure call. According to the illustrated program flow, the "main" program includes a call to a procedure referred to as "proc1." The proc1 procedure includes a call to a procedure referred to as "proc2." The proc2 procedure includes a call to a procedure referred to as "proc3."

Accordingly, proc1 comprises the first, top-level procedure in a linked chain of successive procedure calls. Procedure chains are characterized in that the return address for the return instruction in each successively called procedure "points" back to the return instruction of the immediately prior procedure. That is, the return address for the return instruction of proc3 is the address of the return instruction of proc2, and the return address for the return instruction of proc2 is the address of the next instruction after the original calling procedure, proc1.

FIG. 4 illustrates operation of the return stack controller 34 for the program flow of FIG. 3. The main program includes a call instruction at address "b1" to the procedure proc1, therefore the return stack controller 34 pushes the return address b1+1 onto the return stack 32 (Step 100). In turn, the procedure prod includes a call instruction at address "b2" to the procedure proc2, therefore the return stack controller 34 pushes the return address b2+1 onto the return stack 32 (Step 102). Finally, the procedure proc2 includes a call instruction at address b3 to the procedure proc3, therefore the return stack controller 34 pushes the return address b3+1 onto the return stack 32 (Step 104). That sequence of pushes results in the return stack 32 holding the return addresses b3+1, b2+1, and b1+1, with b3+1 held at the top of the return stack 32.

For the return instruction of proc3, a conventional method of return stack management would pop the topmost stack value, b3+1, and use that as the predicted return address for instruction pre-fetching. That would fetch the return instruction of proc2, causing the return stack 32 to pop the address b2+1, which would fetch the return instruction of proc1, causing the return stack 32 to pop b1+1. This successive return stack popping and instruction pre-fetching wastes both power and processor execution time, adversely impacting performance. Because of the chained nature of the successive procedure calls, the actual return address location is b1+1 in the original, top-level calling procedure, proc1. Thus, the return stack controller 34 optimizes performance by determining the number of levels it must pop from the return stack 32 to obtain the correct, top-level return address for the return instruction of proc3 (Step 106).

The return stack controller 34 pops that number of return addresses from the return stack 32 (Step 108), and uses the last popped return address—here, b1+1—as the predicted return address for the pre-fetch unit (PFU) 14 (Step 110). While this discussion frames the operational description in terms of pushing and popping return address onto and off of the return stack 32, it should be understood that such operations may be based on logically moving a stack pointer as needed, so that the pointed-to value in the return stack 32 represents the return address used for instruction pre-fetching.

FIG. 4 is a non-limiting example of the return stack controller's ability to skip over intermediate return addresses stored on the return stack 32 and provide the return address corresponding to the first, top-level procedure in a chain of successive procedure calls upon predicting or otherwise encountering the return instruction of the last procedure in that chain. More generally, the return stack controller 34 is configured to determine the number of return levels associated with a given return instruction, and pop the return stack 32 a corresponding number of times to obtain a return address for instruction pre-fetching.

FIG. 5 illustrates one mechanism for determining the number of return levels associated with any given return instruction, wherein the return instruction includes or is associated with a return-level indicator whose value indicates the number of return levels. Thus, in one or more embodiments, the instruction set recognized and used by the microprocessor 10 includes a return instruction comprising a return operational code ("opcode") and a return-level indicator field or tag that is embedded with the opcode, or otherwise linked to it. Thus, as shown in FIG. 6, determining the number of return levels associated with any given return instruction comprises reading the instruction's return-level field or tag.

The return stack controller 34 can be configured to implement the processing logic of FIG. 6, wherein the return stack controller 34 determines whether a given return instruction includes or is associated with a return-level indicator (Step 120). If so (Step 122), the return stack controller 34 pops the return stack 32 a corresponding number of times (Step 124) to obtain a return address for instruction pre-fetching. If not (Step 122), the return stack controller 34 pops the return stack 32 a default number of times (Step 126) to obtain a return address for instruction pre-fetching. The default number of times may be one time, for example.

In one embodiment, a program compiler could be configured to generate a return-level indicator for every return instruction, and the return stack controller 34 could thus be configured always to read the corresponding return-level indicator value for every return instruction and to control return stack popping accordingly. However, as shown in FIG. 6, the program compiler may generate return-level indicators only where the number of return levels exceeds the default value of one. In other words, a first type of return instruction does not include a return-level indicator and the return stack controller 34 is configured to recognize this as an implicit indicator that the return stack 32 should be popped once. A second type of return instruction does include a return-level indicator and the return stack controller is configured to use the value of that return-level indicator to control stack popping.

One or more embodiments of the program compiler may be configured to generate return-level indicators for return instructions according to the processing logic illustrated in FIG. 7. The compiler can be configured to determine whether two or more successive procedure calls are chained together as a multi-level procedure call (Step 130). The compiler can recognize multi-level procedure calls by determining whether the return instruction of a called procedure points back to the return instruction of the calling procedure, for example.

If a given procedure call is not part of a multi-level procedure call chain, the compiler can clear return-level tracking information, such as calling level counters, etc. (Step 132), and continue normal compilation operations as needed. However, if the compiler detects a multi-level procedure call, it tracks the nesting (calling) depth of the multi-level procedure call. One method of tracking the nesting depth comprises counting the successively chained procedure calls (Step 134). The compiler thus may maintain a counter to accumulate the calling depth of the multi-level procedure.

Upon detecting the return instruction of the last procedure in the chain (Step 136), the compiler sets the return level indicator for that instruction based on the tracked count (Step 138). Thus, as explained above, the compiler may set the value of the return-level indicator for that last procedure's return instruction based on the accumulated count. Setting this value at compile-time thus enables the return stack controller 34 to perform a multi-level return address prediction at run time, i.e., when the microprocessor 10 is executing the compiled program code.

It should be understood, too, that the processing logic of FIG. 7 may be implemented as dynamic, run-time processing carried out by the return stack controller 34, or by other supporting logic within the microprocessor 10. For example, the return stack controller 34 can be configured to cooperate with the core's instruction execution unit or other logic during run-time processing to detect multi-level procedures, track the calling depth of those procedures, and generate the appropriate return-level indicator for predicting the top-level return address. Thus, the return stack controller 34 or other circuit within the core 12 can be configured with the necessary logic and memory circuit elements needed to recognize chained procedure calls, to track/count the calling depth of chained procedure calls, and to generate the corresponding return-level indicator values for controlling return address predictions.

In general, the number of return levels can be determined at compile-time or at run-time. In either case, the number of return levels associated with a given instruction can be determined by counting procedure calls in a chained sequence, such that the return address predicted for the return instruction of the last procedure in the chain is the return address of the top-level, original calling procedure rather than the address of the immediately prior procedure in the chain.

In any case, the microprocessor 10 implements a method of predicting return addresses for instruction pre-fetching for chained sequences of procedure calls based on substituting the return address of a first procedure call in the chained sequence of procedure calls for the return address of the last procedure call in the chained sequence of procedure calls, and providing the substituted return address for instruction pre-fetching. Chained procedure calls can be detected by recognizing that, for a given current program procedure, a call to a next program procedure is the last instruction prior to the current procedure's return instruction. In this manner, performance of the microprocessor 10 is optimized in the execution of chained procedure calls, as superfluous, intermediate return instructions are not fetched into the microprocessor's instruction pipeline and executed.

Those skilled in the art should appreciate that the foregoing discussion of one or more embodiments does not limit the present invention, nor do the accompanying figures. Rather, the present invention is limited only by the following claims, and their legal equivalents.

What is claimed is:

1. A method of managing a return stack comprising:
   determining the number of return levels associated with a return instruction; and
   popping that number of return addresses from the return stack.

2. The method of claim 1, further comprising providing the last popped return address from the return stack to an instruction pre-fetch unit as the predicted return address for instruction pre-fetching.

3. The method of claim 1, wherein determining the number of return levels associated with a return instruction comprises reading a return-level indicator value associated with the return instruction.

4. The method of claim 3, wherein reading a return-level indicator value associated with the return instruction comprises reading a value embedded in the return instruction.

5. The method of claim 1, wherein determining the number of return levels associated with a return instruction comprises determining whether a return instruction includes an embedded return level indicator and, if so, determining the number of return levels by reading the return level indicator and, if not, determining the number of return level indicators based on a default return level setting for the return stack.

6. The method of claim 5, further comprising setting the default return level setting for the return stack to one, such that the return stack pops one return address from the return stack for return instructions that lack embedded return level indicators, and pops the indicated number return address from the return stack for return addresses that include embedded return level indicators.

7. The method of claim 1, wherein determining the number of return levels associated with a return instruction comprises counting the number of procedure calls in a chained sequence of procedure calls.

8. The method of claim 1, wherein determining the number of return levels associated with a return instruction comprises detecting chained procedure calls, tracking a nesting depth of a given chain of procedure calls, and setting the number of return levels for a last return instruction in the given chain of procedure calls according to the nesting depth.

9. A return stack circuit comprising:
   a return stack configured to store a plurality of return addresses;
   a return stack controller generally configured to push return addresses sequentially onto the return stack and to pop return addresses sequentially from the return stack, and particularly configured to determine the number of return levels associated with a given return instruction, and pop that number of return addresses from the return stack.

10. The return stack circuit of claim 9, wherein the return stack controller is further configured to provide the last popped return address from the return stack to an instruction pre-fetch unit as the predicted return address for instruction pre-fetching.

11. The return stack circuit of claim 9, wherein the return stack controller is configured to determine the number of return levels associated with a return instruction by reading a return-level indicator value associated with the given return instruction.

12. The return stack circuit of claim 11, wherein the return stack controller is configured to read a value embedded in the given return instruction as the return-level indicator.

13. The return stack circuit of claim 9, wherein the return stack controller is configured to determine the number of return levels associated with the given return instruction by determining whether the given return instruction includes an embedded return level indicator and, if so, determining the number of return levels by reading the return level indicator and, if not, determining the number of return level indicators based on a default return level setting for the return stack.

14. The return stack circuit of claim 13, further comprising setting the default return level setting for the return stack to one, such that the return stack pops one return address from the return stack for return instructions that lack embedded return level indicators, and pops the indicated number return addresses from the return stack for return instructions that include embedded return level indicators.

15. The return stack circuit of claim 9, wherein the return stack controller is configured to determine the number of return levels associated with the given return instruction by counting the number of procedure calls in a chained sequence of procedure calls.

16. The return stack circuit of claim 9, wherein the return stack controller is configured to determine the number of return levels associated with the given return instruction by detecting chained procedure calls, tracking a nesting depth of a given chain of procedure calls, and setting the number of return levels for a last return instruction in the given chain of procedure calls according to the nesting depth.

17. A method of computer program compilation comprising:
- determining the number of return levels associated with a return instruction; and
- setting a return-level indicator associated with the return instruction to a value corresponding to that number.

18. The method of claim 17, wherein determining the number of return levels associated with a return instruction comprises counting the number of procedure calls in a chained sequence of procedure calls.

19. The method of claim 17, wherein determining the number of return levels associated with a return instruction comprises detecting chained procedure calls, tracking a nesting depth of a given chain of procedure calls, and setting the number of return levels for a last return instruction in the given chain of procedure calls according to the nesting depth.

20. The method of claim 17, wherein setting a return-level indicator associated with the return instruction to a value corresponding to that number comprises setting a value embedded in the return instruction.

21. A method of predicting return addresses for instruction pre-fetching for chained sequences of procedure calls, comprising:
- substituting the return address of a first procedure call in the chained sequence of procedure calls for the return address of the last procedure call in the chained sequence of procedure calls; and
- providing the substituted return address for instruction pre-fetching.

22. The method of claim 21, further comprising detecting chained sequences of procedure calls by recognizing that, for a given current program procedure, a call to a next program procedure is the last instruction prior to the current procedure's return instruction.

23. The method of claim 22, further comprising detecting chained sequences of procedure calls during program compilation.

24. The method of claim 22, further comprising detecting chained sequences of procedure calls during program execution.

25. The method of claim 21, wherein substituting the return address of a first procedure call in the chained sequence of procedure calls for the return address of the last procedure call in the chained sequence of procedure calls comprises sequentially pushing return addresses onto a return stack for successive procedure calls in the chained sequence of procedure calls, and, responsive to a return instruction for the last procedure call, popping the return stack the number of times needed to obtain the return address of the first procedure call.

* * * * *